(12) United States Patent
Watanabe (10) Patent No.: US 6,762,814 B2
(45) Date of Patent: Jul. 13, 2004

(54) IN-PLANE SWITCHING MODE LIQUID CRYSTAL DISPLAY DEVICE AND METHOD OF FABRICATING THE SAME

(75) Inventor: Makoto Watanabe, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 136 days.

(21) Appl. No.: 10/186,585

(22) Filed: Jul. 1, 2002

(65) Prior Publication Data

US 2003/0002000 A1 Jan. 2, 2003

(30) Foreign Application Priority Data

Jul. 2, 2001 (JP) ........................................ 2001-201230

(51) Int. Cl.[7] .............................................. G02F 1/1343
(52) U.S. Cl. ...................... 349/141; 349/138; 349/123
(58) Field of Search ................................. 349/141, 139, 349/128, 123, 132, 122, 138

(56) References Cited

U.S. PATENT DOCUMENTS 4,929,060 A * 5/1990 Sugimoto et al. ........... 349/107
6,146,796 A * 11/2000 Kim ............................ 430/30

FOREIGN PATENT DOCUMENTS

| JP | 06-075243 | 3/1994 | ............ G02F/1/136 |
| JP | 08-106100 | 4/1996 | ......... G02F/1/1339 |
| JP | 09-258265 | 10/1997 | ............ G02F/1/136 |

OTHER PUBLICATIONS

Ito Etching Shift Characteristics on Organic Insulating Film; Discussed by: Y. Kataoka, T. Fujikawa, M. Kokura, T. Shimada, M. Ayukawa and H. Kato; ISSN 1083–1312/00/2001, pp.123–126.

* cited by examiner

*Primary Examiner*—Diane I. Lee
*Assistant Examiner*—Lisa M. Caputo
(74) *Attorney, Agent, or Firm*—Hayes Soloway P.C.

(57) ABSTRACT

An in-plane switching type liquid crystal display device includes (a) a first film composed of inorganic material, (b) a second film composed of organic material, both of the first and second films being to be formed below an electrode as underlying films, (c) a first vernier formed on the first film for measuring a width of the electrode, and (d) a second vernier formed on the second film for measuring a width of the electrode.

13 Claims, 6 Drawing Sheets

IN-PLANE SWITCHING MODE LIQUID CRYSTAL DISPLAY DEVICE AND METHOD OF FABRICATING THE SAME

BACKGROUND OF THE INVENTION

1. Field of the Invention

The invention relates to a liquid crystal display device and a method of fabricating the same, and more particularly to an in-plane switching mode liquid crystal display device and a method of fabricating the same.

2. Description of the Related Art

A method of fabricating a liquid crystal display device usually includes a step in which patterns have to be overlapped each other without misregistration.

For instance, a gate electrode, a source electrode and a drain electrode all to be formed on a thin film transistor (TFT) substrate are usually formed in a multi-layered pattern. In such a multi-layered pattern, misregistration in overlapping a lower layer pattern of which a gate electrode is comprised and an upper layer pattern of which source and drain electrodes are comprised each other has to be quite small.

Similarly, when a plurality of patterns is to be formed in a common layer, misregistration in a boundary at which adjacent patterns are contiguous to each other has to be quite small.

In addition, a difference between an actual dimension of a pattern having been actually formed in a photolithography step and a dimension defined by a mask, that is, a designed dimension has to be equal to or smaller than a threshold.

Since it is almost impossible to accurately measure the above-mentioned misregistration and difference in dimensions after a liquid crystal display device has been fabricated, a vernier is frequently used for indirectly measuring the misregistration and difference.

For instance, Japanese Unexamined Patent Publication No. 6-75243 has suggested a liquid crystal display device including a vernier pattern for measuring the above-mentioned misregistration and difference in a display area.

A liquid crystal display device may be grouped into a first type in which molecular axes of aligned liquid crystal molecules are rotated in a plane perpendicular to a substrate to display a certain image, and a second type in which molecular axes of aligned liquid crystal molecules are rotated in a plane parallel with a substrate to display a certain image. Herein, a direction of axes of aligned liquid crystal molecules is called a director.

A typical one in the first type is a twisted nematic (TN) mode liquid crystal display device, and the second type is called an in-plane switching (IPS) mode liquid crystal display device.

Since a viewer looks only at a direction in which minor axes of liquid crystal molecules extend, even if he/she moves his/her eye point, in an IPS mode liquid crystal display device, how liquid crystal molecules stand is not dependent on a viewing angle, and accordingly, an IPS liquid crystal display device can present a wider viewing angle to a viewer than a TN mode liquid crystal display device.

Hence, an IPS mode liquid crystal display device has been more popular these days than a TN mode liquid crystal display device.

In an in-plane switching (IPS) mode liquid crystal display device, it is necessary to accurately control a width of a line of which an electrode is comprised. If such a line had a width much different from a designed width, a liquid crystal display device would have deteriorated uniformity in a brightness in a display area, or a liquid crystal display device could not have an electric field having an optimal intensity, resulting in deterioration in a brightness.

For instance, in a TN mode liquid crystal display device, a line of which an electrode is comprised is required to have a width controlled at an accuracy in the range of ±1.5 to 2.0 micrometers, whereas, in an in-plane switching mode liquid crystal display device, a line of which an electrode is comprised is required to have a width controlled at an accuracy in the range of ±0.2 to 0.3 micrometers.

An underlying film to be formed below an electrode in a liquid crystal display device is usually composed of inorganic or organic material. As mentioned above, a line of which an electrode is comprised in an in-plane switching mode liquid crystal display device is required to have an accurately controlled width. An organic film usually discharges gas when an ITO film is formed by sputtering. An etching rate of an electrode formed on an organic film is greater than an etching rate of an electrode formed on an inorganic film. Accordingly, it is more difficult to control a line width of an electrode formed on an organic film than to control a line width of an electrode formed on an inorganic film.

Japanese Unexamined Patent Publication No. 8-106100 (A) has suggested a method of fabricating a liquid crystal display device including two transparent substrates, and a liquid crystal layer sandwiched between the transparent substrates. In the suggested method, a transparent electrode and a scale are formed on at least one of upper and lower surfaces of the transparent substrates, and then, the transparent substrate are adhered to each other through sealing material coated at a periphery of the transparent substrates. When necessary, a line width of the sealing material is measured by means of the scale.

Japanese Unexamined Patent Publication No. 9-258265 (A) has suggested a liquid crystal display device including two electrically insulating substrates, and a liquid crystal layer sandwiched between the electrically insulating substrates. One of the electrically insulating substrates are formed a plurality of switching devices arranged in matrix, first and second wirings electrically connected to the switching devices, an interlayer insulating film covering the first and second wirings therewith and having an upper surface and an inclining surface, and first and second electrodes one of which is electrically connected to the switching devices, for applying an electric field to the liquid crystal layer. The first and second electrodes cover the upper and inclining surfaces of the interlayer insulating film to thereby apply the electric field to the liquid crystal layer in parallel with the electrically insulating substrates.

ITO etching shift characteristics on an organic insulating film is discussed by Y. Kataoka et al. in ISSN 1083-1312/00/2001, pp. 123–126.

However, the above-mentioned problem remains unsolved in those Publications.

SUMMARY OF THE INVENTION

In view of the above-mentioned problems in the conventional in-plane switching mode liquid crystal display device, it is an object of the present invention to provide an in-plane switching mode liquid crystal display device including an inorganic film and an organic film as underlying films to be formed below an electrode which device is capable of accurately controlling a line width of an electrode formed on those inorganic and organic films.

It is also an object of the present invention to provide a method of fabricating such an in-plane switching mode liquid crystal display device.

In one aspect of the present invention, there is provided an in-plane switching type liquid crystal display device including (a) a first film composed of inorganic material, (b) a second film composed of organic material, both of the first and second films being to be formed below an electrode as underlying films, (c) a first vernier formed on the first film for measuring a width of the electrode, and (d) a second vernier formed on the second film for measuring a width of the electrode.

The in-plane switching type liquid crystal display device in accordance with the present invention includes the first and second verniers formed on the first and second films, respectively. Hence, it is possible to measure a line width of an electrode formed on the first film and a line width of an electrode formed on the second film independently of each other, and thus, it is possible to control a line width of the electrodes. This ensures enhancement in a fabrication yield of an in-plane switching type liquid crystal display device.

The first vernier may be designed to have a centerline extending in the same direction as a direction in which a centerline of the second vernier extends.

For instance, each of the first and second verniers may be comprised of a metal film including (c1) a plurality of first metal linear regions extending in a first direction and arranged in a second direction perpendicular to the first direction such that the first metal linear regions are equally spaced away from one another, (c2) a plurality of second metal linear regions extending in the first direction and arranged in the second direction such that the second metal linear regions are equally spaced away from one another, (c3) a plurality of first slits extending in the first direction and arranged in the second direction such that the first slits are contiguous to the first metal linear regions, and (c4) a plurality of second slits extending in the first direction and arranged in the second direction such that the second slits are contiguous to the second metal linear regions. A first metal linear region located at an end has a first width equal to a width of the electrode to be measured, and a first metal linear region located remoter from the end has a width equally smaller than the first width. A second metal linear region located at the end has the first width, and a second metal linear region located remoter from the end has a width equally greater than the first width. The first and second slits commonly have the first width.

The metal film may be composed of indium tin oxide (ITO).

The electrode may be composed of electrically conductive transparent material such as indium tin oxide (ITO).

There is further provided an in-plane switching type liquid crystal display device including (a) a first film composed of organic material, and formed below an electrode in a display area as an underlying film, (b) a second film composed of inorganic material, and formed below an electrode in a terminal area extending around the display area, (c) a first vernier formed on the first film for measuring a width of the electrode, and (d) a second vernier formed on the second film for measuring a width of the electrode.

The in-plane switching type liquid crystal display device in accordance with the present invention includes the first vernier formed on the first film in a display area and the second vernier formed on the second film in a terminal area.

Hence, it is possible to measure a line width of an electrode formed on the first film and a line width of an electrode formed on the second film independently of each other, and thus, it is possible to control a line width of the electrodes. This ensures enhancement in a fabrication yield of an in-plane switching type liquid crystal display device.

In another aspect of the present invention, there is provided a method of fabricating an in-plane switching type liquid crystal display device, including the steps of (a) forming a first film composed of inorganic material, on a substrate, (b) forming a second film on the first film in a display area of the liquid crystal display device, the second film being composed of organic material, (c) fabricating a first vernier on the first film in a terminal area extending around the display area, for measuring a width of an electrode, (d) fabricating a second vernier on the second film for measuring a width of the electrode, and (e) forming the electrode on the first and second films.

In the method of fabricating an in-plane switching type liquid crystal display device, in accordance with the present invention, the first vernier is formed on the first film in a display area and the second vernier is foxed on the second film in a terminal area. Hence, it is possible to measure a line width of an electrode formed on the first film and a line width of an electrode formed on the second film independently of each other, and thus, it is possible to control a line width of the electrodes. This ensures enhancement in a fabrication yield of an in-plane switching type liquid crystal display device.

The first and second verniers may be formed in separate steps, or may be formed in a common step. Specifically, the above-mentioned steps (c) and (d) may be carried out separately or concurrently.

It is preferable that the second vernier is fabricated in the step (d) such that it has a centerline extending in the same direction as a direction in which a centerline of the first vernier extends.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
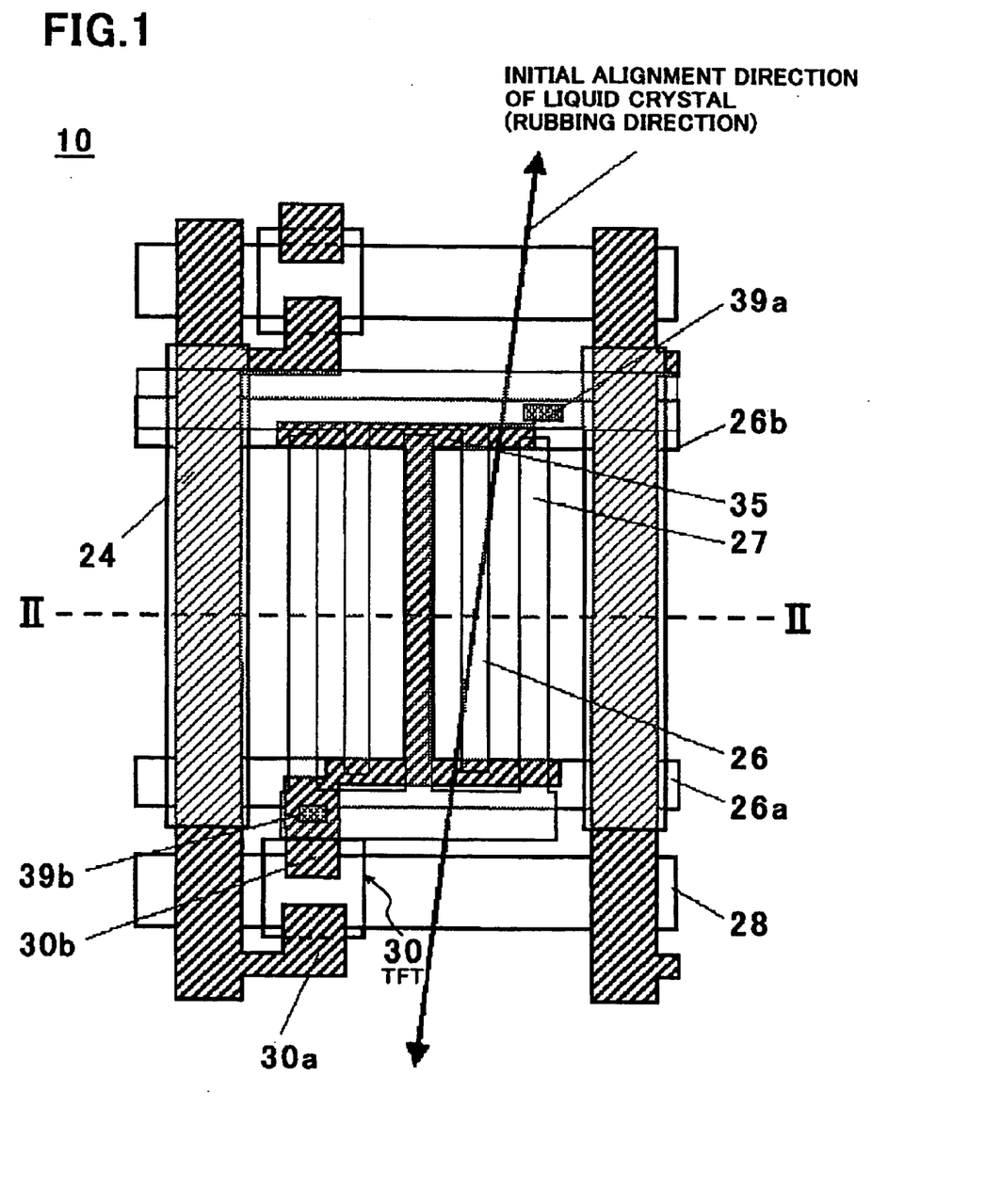
FIG. 1 is a plan view of a unit pixel in an in-plane switching mode liquid crystal display, device in accordance with the embodiment of the present invention.
Figure 2:
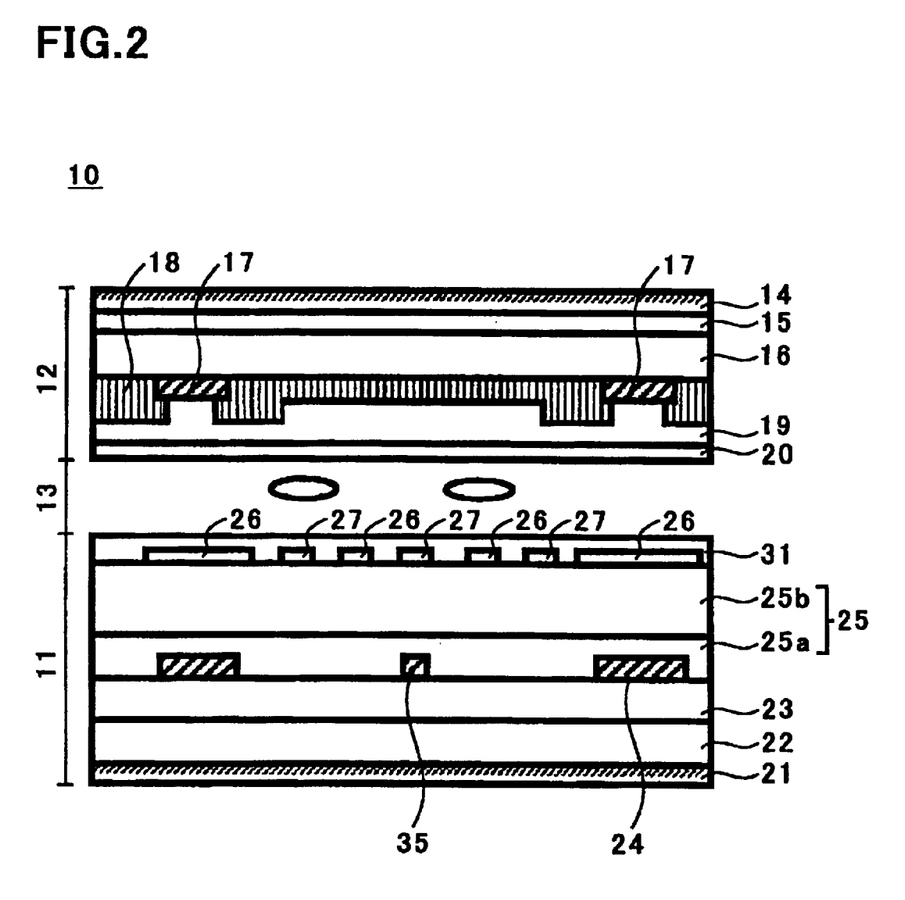
FIG. 2 is a cross-sectional view taken along the line II—II in FIG. 1.
Figure 3:
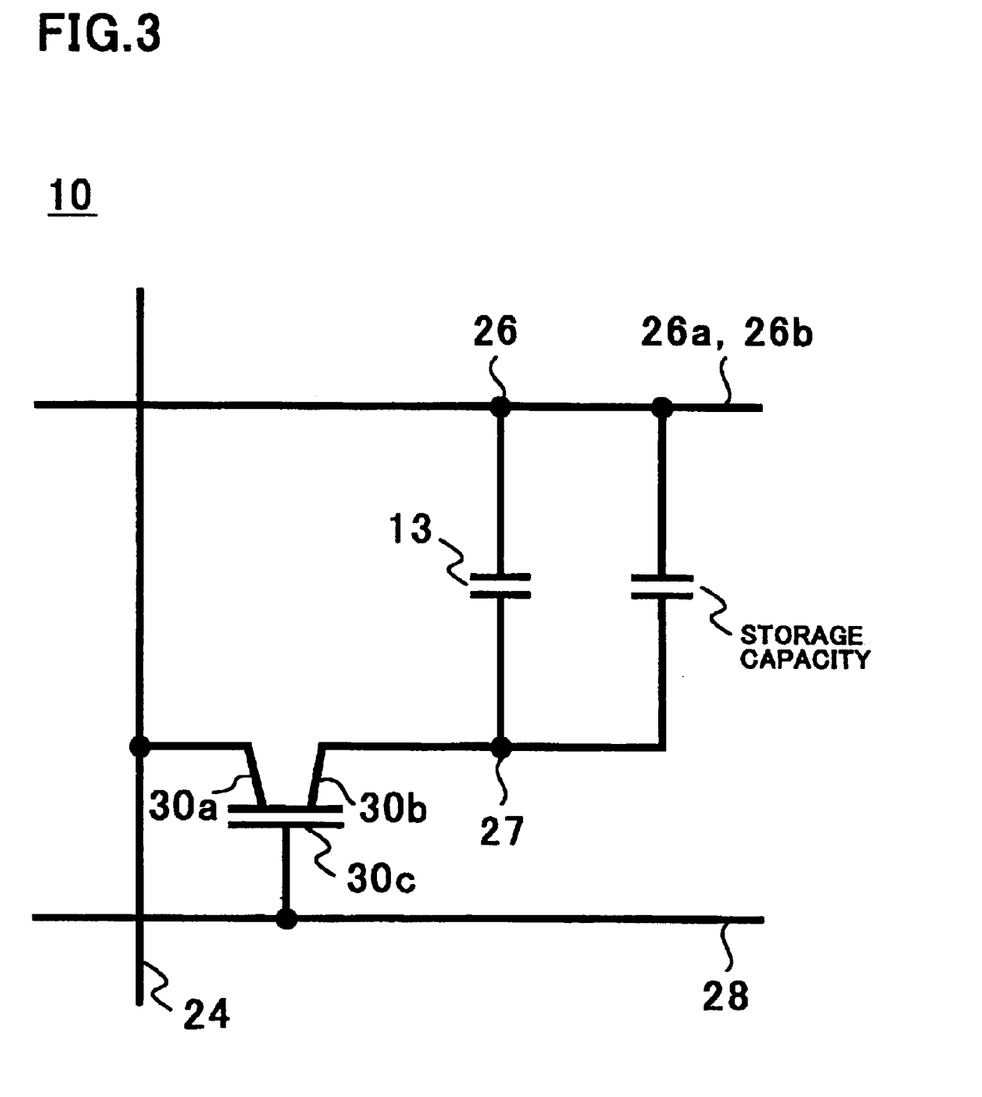
FIG. 3 is a circuit diagram of the unit pixel illustrated in FIG. 1.

FIGS. 1, 2 and 3 illustrate an in-plane switching mode active matrix type liquid crystal display device in accordance with the first embodiment of the present invention. FIG. 1 is a plan view of a unit pixel of the liquid crystal display device 10 in accordance with the first embodiment, FIG. 2 is a cross-sectional view taken along the line II—II in FIG. 1, and FIG. 3 is a circuit diagram of the unit pixel illustrated in FIG. 1.

As illustrated in FIG. 2, the liquid crystal display device 10 is comprised of an active device substrate 11, an opposing substrate 12, and a liquid crystal layer 13 sandwiched between the active device substrate 11 and the opposing substrate 12.

The opposing substrate 12 includes an electrically insulating transparent substrate 16, a black matrix layer 17 formed on a first surface of the electrically insulating transparent substrate 16 as a light-shielding film, a color layer 18 formed on the first surface of the electrically insulating transparent substrate 16 such that the color layer 18 partially overlaps the black matrix layer 17, a transparent overcoating layer 19 covering the black matrix layer 17 and the color layer 18 therewith, an alignment film 20 formed covering the transparent overcoating layer 19, an electrically conductive layer 15 formed on a second surface of the electrically insulating transparent substrate 16, and a polarizer 14 formed on the electrically conductive layer 15.

The color layer 18 is comprised of resin films containing red (R), green (G) and blue (B) pigments.

The electrically conductive transparent layer 15 prevents electric charges caused by contact of a liquid crystal display panel with other materials, from exerting electrical influence on the liquid crystal layer 13.

The active matrix substrate 11 includes an electrically insulating transparent substrate 22, a first metal layer formed on the electrically insulating transparent substrate 22 and defining a scanning line 28 (see FIG. 1) and a gate electrode 30c (see FIG. 3) therein, a first interlayer insulating film 23 formed on the electrically insulating transparent substrate 22, an island-shaped amorphous silicon film formed on the first interlayer insulating film 23, a second metal layer defining a data line 24, and a source electrode 30b and a drain electrode 30a of a thin film transistor 30 therein, a first film 25a formed on the first interlayer insulating film 23, a second film 25b formed on the first film 25a, a common electrode 26 and a pixel electrode 27 both formed as transparent electrodes on the second film 25b, and a polarizer 21 formed on a lower surface of the electrically insulating transparent substrate 22.

The first and second films 25a and 25b constitute a second interlayer insulating film 25.

The active matrix substrate 11 further includes a pixel auxiliary electrode 35 formed on the first interlayer insulating film 23 together with the data lines 24, The data lines 24 and the pixel auxiliary electrode 35 are comprised of the second metal layer.

In the specification, an "upper" layer means a layer located closer to the liquid crystal layer 13, and a "lower" layer means a layer located remoter from the liquid crystal layer 13 in both the active device substrate 11 and the opposing substrate 12.

The active device substrate 11 and the opposing substrate 12 include alignment films 31 and 20, respectively, both making contact with the liquid crystal layer 13. As illustrated in FIG. 2, the alignment films 31 and 20 are rubbed such that the liquid crystal layer 13 is homogeneously aligned in a direction inclined from a direction in which the common electrode 27 and the pixel electrode 26 extend, by an angle in the range of 10 to 30 degrees, and then, adhered to the active device substrate 11 and the opposing substrate 12, respectively, such that they face each other. The above-mentioned angle is called initial alignment orientation of liquid crystal molecules.

Though not illustrated, spacers are sandwiched between the active device substrate 11 and the opposing substrate 12 to ensure a thickness of the liquid crystal layer 13, and a seal 50 (see FIG. 4) is formed around the liquid crystal layer 13 between the active device substrate 11 and the opposing substrate 12 for avoiding leakage of liquid crystal molecules.

The polarizer 21 of the active device substrate 11 has a polarization axis extending perpendicularly to the liquid crystal initial alignment direction, and the polarizer 14 of the opposing substrate 12 has a polarization axis extending in parallel to the liquid crystal initial alignment direction. The polarization axes extend perpendicularly to each other.

As illustrated in FIG. 1, the active device substrate 11 includes data lines 24 to which data signals are transmitted, common electrode lines 26a and 26b to which a reference voltage is applied, a common electrode 26 to which the reference voltage is applied, a pixel electrode 27 associated with pixels in which images are to be displayed, a scanning line 28 to which a scanning signal is applied, and a thin film transistor (TFT) 30.

The thin film transistor 30 includes a gate electrode 30c (see FIG. 3), a drain electrode 30a and a source electrode 30b. The thin film transistor 30 is formed in the vicinity of an intersection of the scanning line 28 and the data line 24 in association with a pixel. The gate electrode 30c is electrically connected to the scanning line 28, the drain electrode 30a is electrically connected to the data line 24, and the source electrode 30b is electrically connected to the pixel electrode 27.

Both the common electrode 26 and the pixel electrode 27 are designed to have a comb-teeth shape, and the comb-teeth in the common electrode 26 and the pixel electrode 27 extend in parallel with the data lines 24. The comb-teeth of the common electrode 26 and the comb-teeth of the pixel electrode 27 are arranged to be in mesh with each other, and further, spaced away from each other.

As illustrated in FIG. 1, the common electrode 26 formed as a transparent electrode is electrically connected to the common electrode line 26b through a first contact hole 39a.

As illustrated in FIG. 1, the common electrode lines 26a and 26b are both comprised of the first metal layer, and extend in parallel with the scanning line 28. A common electrode voltage is applied to the common electrode lines 26a and 26b at their ends.

The pixel electrode 27 formed as a transparent electrode is electrically connected to the pixel auxiliary electrode 35 comprised of the second metal layer and integrally formed with the source electrode 30b of the thin film transistor 30, through a second contact hole 39b.

In the in-plane switching mode liquid crystal display device 10 in accordance with the first embodiment, an electric field is generated in parallel with the electrically insulating transparent substrates 16 and 22 between the common electrode 26 and the pixel electrode 27 in a pixel which is selected by a scanning signal transmitted through the scanning line 28 and into which a data signal transmitted through the data line 24 is written. The alignment direction of liquid crystal molecules are rotated in a plane parallel with the electrically insulating transparent substrates 16 and 22 in accordance with the electric field to thereby display a certain image. In FIG. 1, a rectangular column surrounded by the common electrode 26 and the pixel electrode 27 is called a column.

In the in-plane switching mode liquid crystal display device 10 in accordance with the first embodiment, both of the common electrode 26 and the pixel electrode 27 are composed of indium tin oxide (ITO), a transparent material.

The first interlayer insulating film 23 is comprised of an inorganic film composed of inorganic material. The first film 25a is comprised of an inorganic film composed of inorganic material, and the second film 25b is comprised of an organic film composed of organic material.

An organic film has a smaller dielectric constant than that of an inorganic film. Hence, the second interlayer insulating film 25 having such a multi-layered structure could have a reduced dielectric constant in comparison with having a single-layered structure of an inorganic film. As a result, parasitic capacity between wirings can be reduced.

When the second interlayer insulating film 25 is designed to have a multi-layered structure including the first film 25a and the second film 25b, the first film 25a may be composed of silicon nitride SiNx, and the second film 25b may be composed of photosensitive acrylic resin or photosensitive polyimide resin, for instance.

The second interlayer insulating film 25b may be comprised of a single organic layer, in which case, the second interlayer insulating film 25b may be composed of benzocyclobutene (BCB), organic polysilazane, or siloxane, for instance.

Figure 4:
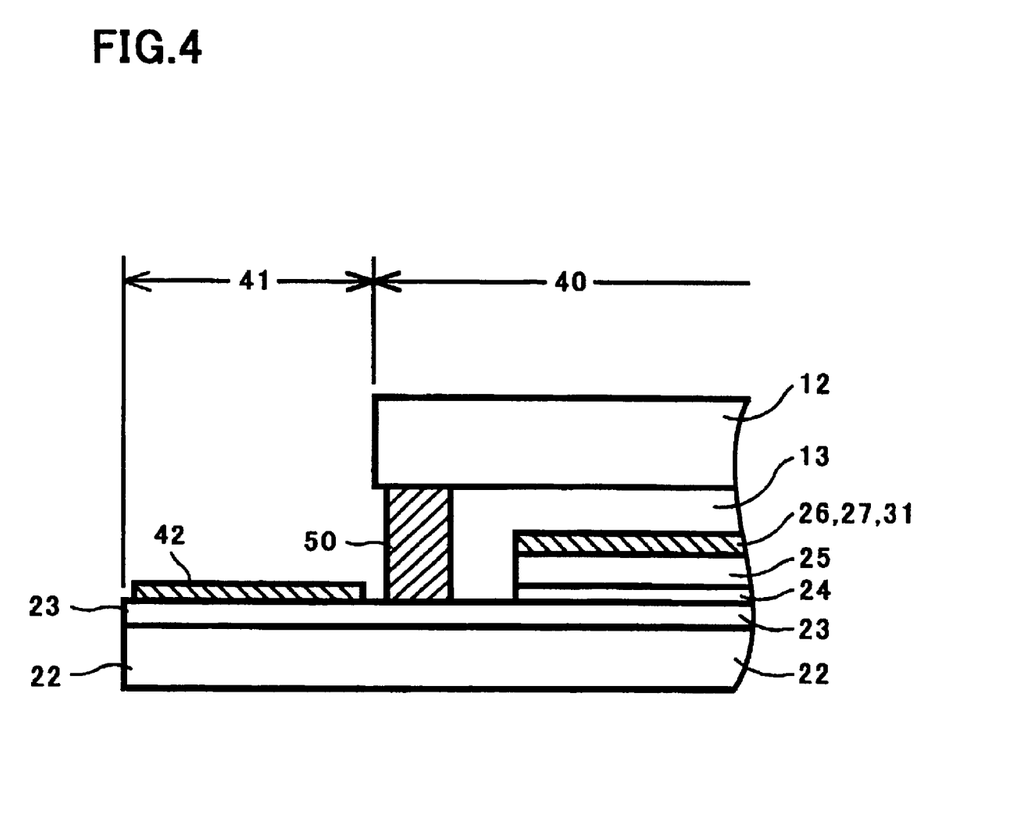
FIG. 4 is a partial cross-sectional view of a boundary between a display area and a terminal area in the in-plane switching mode liquid crystal display device illustrated in FIG. 1.
Figure 5:
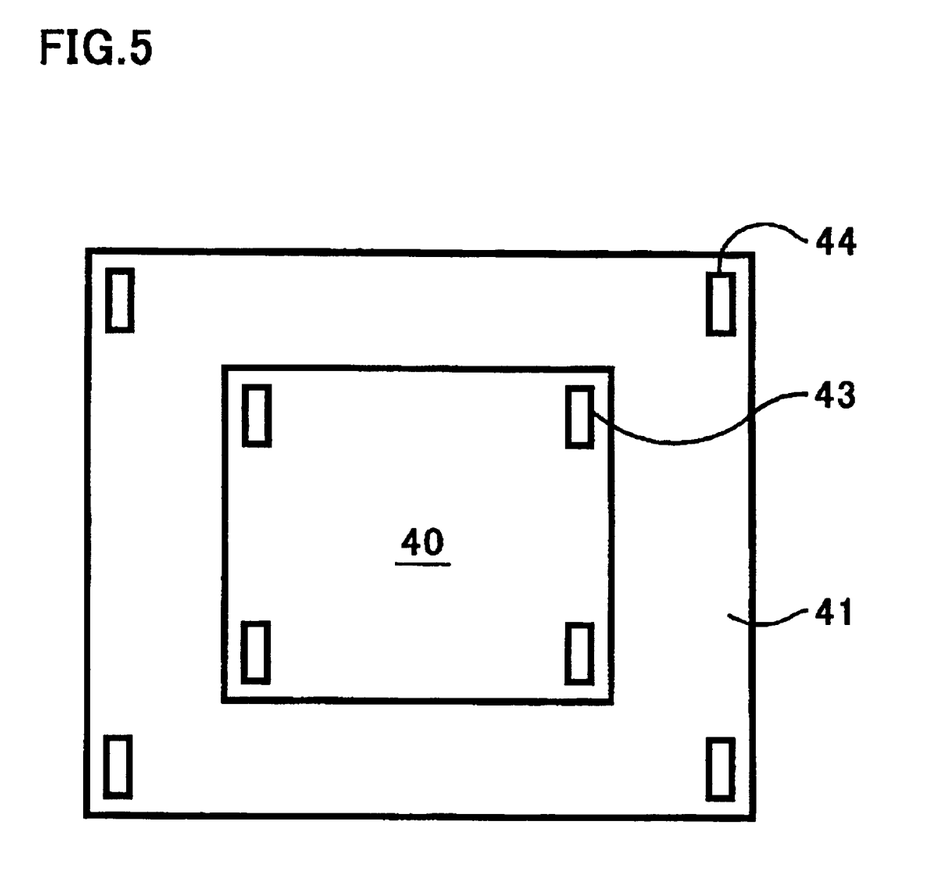
FIG. 5 is a plan view showing a positional relation between a display area and a terminal area in the in-plane switching mode liquid crystal display device illustrated in FIG. 1.

FIG. 4 is a partial cross-sectional view of a boundary between a display area 40 and a terminal area 41 extending around the display area 40, in the in-plane switching mode liquid crystal display device 10 in accordance with the first embodiment. FIG. 5 is a plan view showing a positional relation between the display area 40 and the terminal area 41 in the in-plane switching mode liquid crystal display device 10.

As illustrated in FIG. 4, the layers constituting the active device substrate 11, such as the first interlayer insulating film 23, the data line 24 and the second interlayer insulating film 25, are formed only in the display area 40. In contrast, the terminal area 41 covers the electrically insulating transparent substrate 22, the first interlayer insulating film 23 composed of organic material and formed on the electrically insulting transparent substrate 22, and an electrically conductive transparent film 42 composed of ITO and formed on the first interlayer insulating film 23.

As illustrated in FIG. 5, the in-plane switching mode liquid crystal display device 10 in accordance with the first embodiment is designed to include first verniers 43 formed on the second film 25b at four corners in the rectangular display area 40, and second verniers 44 formed on the first interlayer insulating film 23 at four corners in the rectangular terminal area 41.

The first and second verniers 43 and 44 are arranged such that centerlines 45 (see FIG. 6) of them extend in the same direction. In the first embodiment, as illustrated in FIG. 5, the first and second verniers 43 and 44 are arranged such that they have centerlines extending in parallel with one of sides of the display area 40.

The first verniers 43 are used for measuring a line width of the common electrode 26 and the pixel electrode 27 both formed on the second film 25b in the display area 40, and the second verniers 44 are used for measuring a line width of the electrically conductive transparent film 42 formed on the first interlayer insulating film 23 in the terminal area 41.

The first and second verniers 43 and 44 may be identical in shape to each other, or may be different in shape from each other. The in-plane switching mode liquid crystal display device 10 in accordance with the first embodiment is designed to include the first and second verniers 43 and 44 identical in shape to each other.

Figure 6:
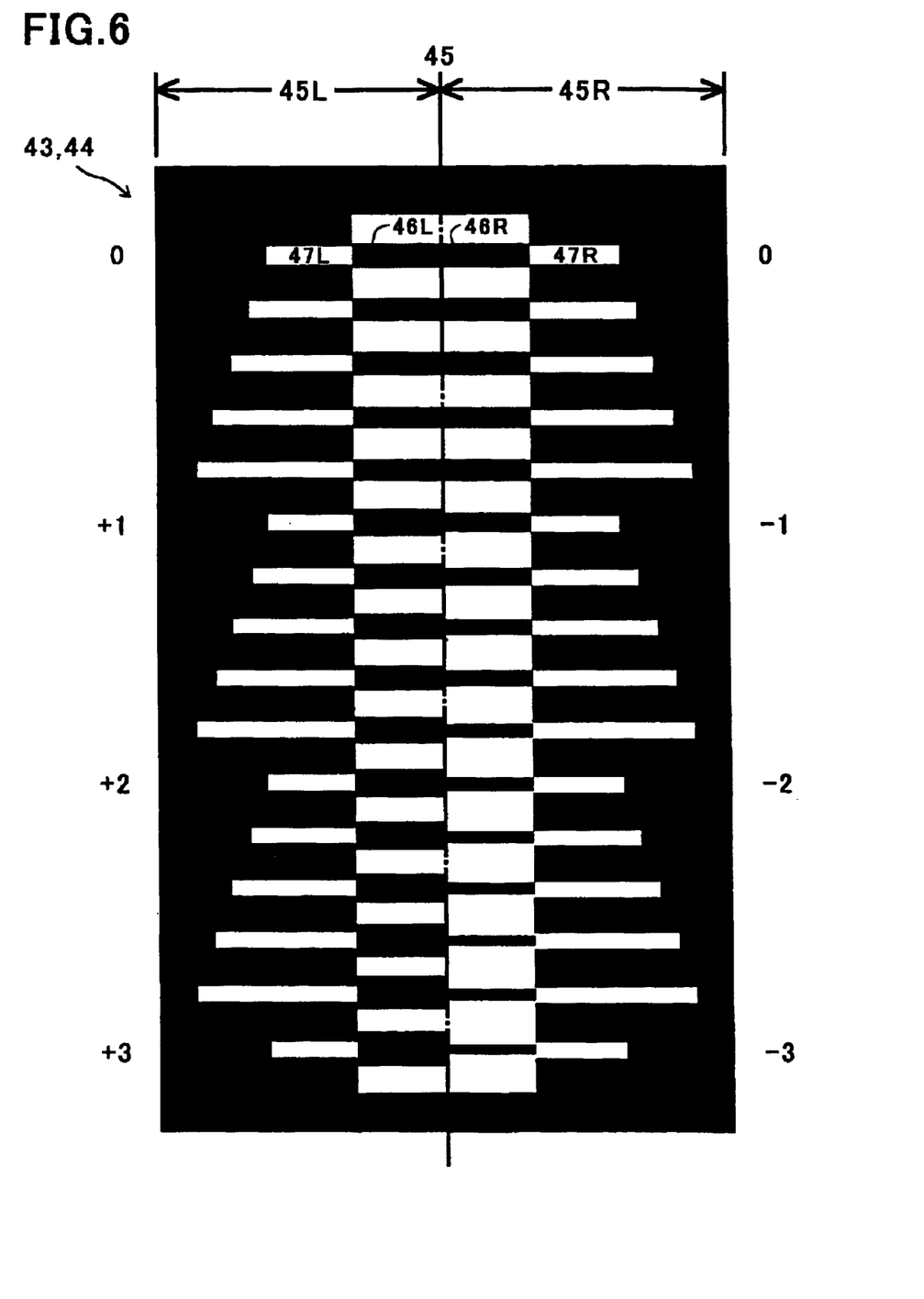
FIG. 6 is a plan view illustrating an example of a vernier used in the in-plane switching mode liquid crystal display device illustrated in FIG. 1.

FIG. 6 is a plan view of an example of the first and second verniers 43 and 44.

Each of the first and second verniers 43 and 44 is comprised of a metal film having a particular pattern. For instance, each of the first and second verniers 43 and 44 may be comprised of an ITO film. In FIG. 6, solid areas indicate areas in which a metal film remains, and hollow areas indicate areas in which a metal film is eliminated.

Each of the first and second verniers 43 and 44 has a left half 45L and a right half 45R A centerline 45 extends in a length-wise direction of the first and second verniers 43 and 44 along a boundary between the left half 45L and the right half 45R.

Each of the first and second verniers 43 and 44 includes a plurality of first metal linear regions 46R, a plurality of second metal linear regions 46L, a plurality of first slits 47R, and a plurality of second slits 47L. The first metal linear regions 46R and the first slits 47R are formed in the right half 45R, and the second metal linear regions 46L and the second slits 47L are formed in the left half 45L.

The first metal linear regions 46R extend in a horizontal direction, and are arranged in a vertical direction such that the first metal linear regions 46R are equally spaced away from one another.

The first slits 47R extend in a horizontal direction, and are arranged in a vertical direction such that the first slits 47R are contiguous to the first metal linear region 46R.

A first metal linear region 46R located at an uppermost end is designed to have a first width equal to a width of the common electrode 26 or the pixel electrode 27 to be measured, and a first metal linear region 46R located remoter from the uppermost end is designed to have an equally decreasing width relative to the first width.

The first slits 47R are designed to have a width equal to the first width.

The first metal linear regions 46R have a common length. In contrast, the first slits 47R are designed to have an increasing length every five first slits.

The second metal linear regions 46L extend in a horizontal direction, and are arranged in a vertical direction such that the second metal linear regions 46L are equally spaced away from one another.

The second slits 47L extend in a horizontal direction, and are arranged in a vertical direction such that the second slits 47L are contiguous to the second metal linear regions 46L.

A second metal linear region 46L located at an uppermost end is designed to have the first width equal to a width of the common electrode 26 or the pixel electrode 27 to be measured, and a second metal linear region 46L located remoter from the uppermost end is designed to have an equally increasing width relative to the first width.

The second slits 47L are designed to have a width equal to the first width.

The second metal linear regions 46L have a common length. In contrast, the second slits 47L are designed to have an increasing length every five first slits.

Scales "0" to "−3" and "0" to "+3" in FIG. 6 indicate a line width of the first metal linear regions 46R and the second metal linear regions 46L. Scale "0" indicates that a line width of the first metal linear regions 46R and the second metal linear regions 46L is equal to a line width of a mask For instance, scale "−3" indicates that a line width of the first metal linear region 46R associated therewith is thicker than a line width of a mask by 3 micrometers, and scale "+3" indicates that a line width of the second metal linear region 46L associated therewith is thinner than a line width of a mask by 3 micrometers In measuring a line width of the common electrode 26 or the pixel electrode 27 through the use of the first vernier 43, a first metal linear region 46R having a line width equal to a line width of the common electrode 26 or the pixel electrode 27 is first found out among a plurality of the first metal linear regions 46R. In accordance with a location of the thus found-out first metal linear region 46R in a vertical direction, a gap between an actual line width of the common electrode 26 or the pixel electrode 27 and a designed line width or a line width of a mask of the common electrode 26 or the pixel electrode 27 can be measured.

In measuring a line width of the electrically conductive transparent film 42 through the use of the second vernier 44, a second metal linear region 46L having a line width equal to a line width of the electrically conductive transparent film 42 is first found out among a plurality of the second metal linear regions 46L. In accordance with a location of the thus found-out second metal linear region 46L in a vertical direction, a gap between an actual line width of the electrically conductive transparent film 42 and a designed line width or a line width of a mask of the electrically conductive transparent film 42 can be measured.

The in-plane switching type liquid crystal display device 10 in accordance with the first embodiment is fabricated in the same process as a conventional process of fabricating the same, except the following steps.

First, the first interlayer insulating film 23 is formed on the electrically insulating transparent substrate 22. Then, the data line 24, the pixel auxiliary electrode 35, the first film 25a and the second film 25b are formed on the first interlayer insulating film 23 only in the display area 40, as illustrated in FIG. 4.

Then, the first verniers 43 are formed on the second film 25b in the display area 40, and the second verniers 44 are formed on the first interlayer insulating film 23 in the terminal area 41. The first and second verniers 43 and 44 may be formed in separate steps, or may be formed in a common step.

After the formation of the first and second verniers 43 and 44, the common electrode 26 and the pixel electrode 27 are formed on the second film 26b in the display area 40, and then, the alignment film 31 is formed covering the common electrode 26 and the pixel electrode 27 therewith.

In the terminal area 41, the electrically conductive transparent film 42 is formed on the first interlayer insulating film 23.

Then, the active device substrate 11 and the opposing substrate 12 are adhered to each other with the liquid crystal layer 13 being sandwiched therebetween.

Thus, the in-plane switching type liquid crystal display device 10 in accordance with the first embodiment is completed.

In the in-plane switching type liquid crystal display device 10 in accordance with the first embodiment, the first verniers 43 are formed on the second film 25b in the display area 40, and the second verniers 44 are formed on the first interlayer insulating film 23 in the terminal area 41. Hence, it is possible to measure a line width of the common electrode 26 and the pixel electrode 27 formed on the second film 25b and a line width of the electrically conductive transparent film 42 formed on the first interlayer insulating film 23, independently of each other through the use of the first and second verniers 43 and 44. Accordingly, the in-plane switching type liquid crystal display device 10 in accordance with the first embodiment makes it possible to control a line width of the electrodes and film, and ensures enhancement in a fabrication yield of the in-plane switching type liquid crystal display device 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-201230 filed on Jul. 2, 2001 including specification, claims, drawings and summary is incorporated herein by reference in its entirety.

What is claimed is:

1. An in-plane switching type liquid crystal display device including:
   (a) a first film composed of inorganic material;
   (b) a second film composed of organic material, both of said first and second films being to be formed below an electrode as underlying films;
   (c) a first vernier formed on said first film for measuring a width of said electrode; and
   (d) a second vernier formed on said second film for measuring a width of said electrode.

2. The in-plane switching type liquid crystal display device as set forth in claim 1, wherein said first vernier has a centerline extending in the same direction as a direction in which a centerline of said second vernier extends.

3. The in-plane switching type liquid crystal display device as set forth in claim 1, wherein each of said first and second verniers is comprised of a metal film including:
   (c1) a plurality of first metal linear regions extending in a first direction and arranged in a second direction perpendicular to said first direction such that said first metal linear regions are equally spaced away from one another;
   (c2) a plurality of second metal linear regions extending in said first direction and arranged in said second direction such that said second metal linear regions are equally spaced away from one another;
   (c3) a plurality of first slits extending in said first direction and arranged in said second direction such that said first slits are contiguous to said first metal linear regions; and
   (c4) a plurality of second slits extending in said first direction and arranged in said second direction such that said second slits are contiguous to said second metal linear regions,
   wherein a first metal linear region located at an end has a first width equal to a width of said electrode to be measured, and a first metal linear region located remoter from said end has a width equally smaller than said first width, a second metal linear region located at said end has said first width, and a second metal linear region located remoter from said end has a width equally greater than said first width, and said first and second slits commonly have said first width.

4. The in-plane switching type liquid crystal display device as set forth in claim 3, wherein said metal film is composed of indium tin oxide (ITO).

5. The in-plane switching type liquid crystal display device as set forth in claim 1, wherein said electrode is composed of indium tin oxide (ITO).

6. An in-plane switching type liquid crystal display device including:
(a) a first film composed of organic material, and formed below an electrode in a display area as an underlying film;
(b) a second film composed of inorganic material, and formed below an electrode in a terminal area extending around said display area;
(c) a first vernier formed on said first film for measuring a width of said electrode; and
(d) a second vernier formed on said second film for measuring a width of said electrode.

7. The in-plane switching type liquid crystal display device as set forth in claim 6, wherein said first vernier has a centerline extending in the same direction as a direction in which a centerline of said second vernier extends.

8. The in-plane switching type liquid crystal display device as set forth in claim 6, wherein each of said first and second verniers is comprised of a metal film including:
(c1) a plurality of first metal linear regions extending in a first direction and arranged in a second direction perpendicular to said first direction such that said first metal linear regions are equally spaced away from one another;
(c2) a plurality of second metal linear regions extending in said first direction and arranged in said second direction such that said second metal linear regions are equally spaced away from one another;
(c3) a plurality of first slits extending in said first direction and arranged in said second direction such that said first slits are contiguous to said first metal linear regions; and (c4) a plurality of second slits extending in said first direction and arranged in said second direction such that said second slits are contiguous to said second metal linear regions, wherein a first metal linear region located at an end has a first width equal to a width of said electrode to be measured, and a first metal linear region located remoter from said end has a width equally smaller than said first width, a second metal linear region located at said end has said first width, and a second metal linear region located remoter from said end has a width equally greater than said first width, and said first and second slits commonly have said first width.

9. The in-plane switching type liquid crystal display device as set forth in claim 8, wherein said metal film is composed of indium tin oxide (ITO).

10. The in-plane switching type liquid crystal display device as set forth in claim 6, wherein said electrode is composed of indium tin oxide (ITO).

11. A method of fabricating an in-plane switching type liquid crystal display device, including the steps of;
(a) forming a first film composed of inorganic material, on a substrate;
(b) forming a second film on said first film in a display area of said liquid crystal display device, said second film being composed of organic material;
(c) fabricating a first vernier on said first film in a terminal area extending around said display area, for measuring a width of an electrode;
(d) fabricating a second vernier on said second film for measuring a width of said electrode; and
(e) forming said electrode on said first and second films.

12. The method as set forth in claim 11, wherein said steps (c) and (d) are concurrently carried out.

13. The method as set forth in claim 11, wherein said second vernier is fabricated in said step (d) such that it has a centerline extending in the same direction as a direction in which a centerline of said first vernier extends.

* * * * *